US009305672B2

(12) United States Patent
Wagh

(10) Patent No.: US 9,305,672 B2
(45) Date of Patent: Apr. 5, 2016

(54) VITRIFIED CHEMICALLY BONDED PHOSPHATE CERAMICS FOR IMMOBILIZATION OF RADIOISOTOPES

(71) Applicant: UCHICAGO ARGONNE, LLC, Chicago, IL (US)

(72) Inventor: Arun S. Wagh, Naperville, IL (US)

(73) Assignee: UCHICAGO ARGONNE, LLC, Chicago, IL (US)

(*) Notice: Subject to any disclaimer, the term of this patent is extended or adjusted under 35 U.S.C. 154(b) by 64 days.

(21) Appl. No.: 14/291,980

(22) Filed: May 30, 2014

(65) Prior Publication Data

US 2015/0348661 A1 Dec. 3, 2015

(51) Int. Cl.
| | |
|---|---|
| *G21F 9/00* | (2006.01) |
| *G21F 9/30* | (2006.01) |
| *G21F 9/16* | (2006.01) |
| *C04B 35/447* | (2006.01) |
| *C03C 14/00* | (2006.01) |
| *C03C 4/00* | (2006.01) |

(52) U.S. Cl.
CPC ............... *G21F 9/305* (2013.01); *C03C 4/0042* (2013.01); *C03C 14/008* (2013.01); *C04B 35/447* (2013.01); *G21F 9/162* (2013.01); *C03C 2214/14* (2013.01); *C03C 2214/20* (2013.01)

(58) Field of Classification Search
CPC ...................................... G21F 9/00; G21F 9/16
USPC ............................................................ 588/2
See application file for complete search history.

(56) References Cited

U.S. PATENT DOCUMENTS

| | | | |
|---|---|---|---|
| 5,830,815 A | 11/1998 | Wagh et al. |
| 5,846,894 A | 12/1998 | Singh et al. |
| 6,133,498 A | 10/2000 | Singh et al. |
| 7,745,679 B2 | 6/2010 | Wagh et al. |
| 2003/0092554 A1 | 5/2003 | Wagh et al. |
| 2006/0235258 A1 | 10/2006 | Wagh et al. |

OTHER PUBLICATIONS

Vinokurov, S.E. et al., Low-Temperature Immobilization of Actinides and Other Components of High-Level Waste in Magnesium Potassium Phosphate Matrices, Journal of Nuclear Materials 385, 189-192 (2009).
Singh, D. et al., Magnesium Potassium Phosphate Ceramic for TC Immobilization, Journal of Nuclear Materials 348, 272-282 (2006).
Method 1311, Toxicity Characteristic Leaching Procedure, U.S. EPA, 1311-1-1311-35 (1992).
Klein, C. et al., Manual of Mineralogy, Wiley & Sons, 20th Ed., 358-359 (1977).

*Primary Examiner* — Edward Johnson
(74) *Attorney, Agent, or Firm* — Olson & Cepuritis, Ltd.

(57) ABSTRACT

A method of immobilizing a radioisotope and vitrified chemically bonded phosphate ceramic (CBPC) articles formed by the method are described. The method comprises combining a radioisotope-containing material, MgO, a source of phosphate, and optionally, a reducing agent, in water at a temperature of less than 100° C. to form a slurry; curing the slurry to form a solid intermediate CBPC article comprising the radioisotope therefrom; comminuting the intermediate CBPC article, mixing the comminuted material with glass frits, and heating the mixture at a temperature in the range of about 900 to about 1500° C. to form a vitrified CBPC article comprising the radioisotope immobilized therein.

11 Claims, 2 Drawing Sheets

A

B

VITRIFIED CHEMICALLY BONDED PHOSPHATE CERAMICS FOR IMMOBILIZATION OF RADIOISOTOPES

CONTRACTUAL ORIGIN OF THE INVENTION

The United States Government has rights in this invention pursuant to Contract No. DE-ACO2-06CH11357 between the United States Government and UChicago Argonne, LLC representing Argonne National Laboratory.

FIELD OF THE INVENTION

This invention relates to vitrified chemically bonded phosphate ceramics comprising immobilized radioisotopes (e.g., fission products) and methods of immobilizing the radioisotopes therein.

BACKGROUND

Glass vitrification is a preferred method of immobilizing nuclear waste produced by nuclear power plants (spent nuclear fuel), and also legacy defense waste in nuclear countries such as the United States, former Soviet Union countries, France, and United Kingdom. In this vitrification method, the nuclear waste such as spent nuclear fuel and high to low level waste streams, are mixed with borosilicate, aluminum phosphate, or iron phosphate glass frits, and heated to a vitrification temperature that ranges from about 1000 to 1500° C. The resulting melt solidifies into a glassy mass that encapsulates the radioactive and hazardous contaminants present in the waste, and immobilizes them for millions of years. This vitrified mass can be stored in repositories or in special vaults built for that purpose.

The glass vitrification method has drawbacks, however. The nuclear wastes contain very high activity fission products isotopes such as iodine (I-127), cesium (Cs-134 and Cs-137), technetium (Tc-99), and often strontium (Sr-90), which are volatile and become part of the off-gases at their boiling point during vitrification. Technetium often is present in nuclear waste materials as pertechnatate ($TcO_4^-$), which is volatile and can evaporate at a temperature as low as about 140° C. Technetium dioxide ($TcO_2$) evaporates at a temperature of about 800 to 900° C. Cesium, strontium, and iodine also go into vapor phases at relatively low temperatures, and thus their radioisotopes cannot be immobilized in the glass matrix and need to be captured as a separate secondary waste stream and then immobilized in a separate procedure.

Chemically bonded phosphate ceramic (CBPC) based stabilization is based on a method for room temperature immobilization of fission products and works very satisfactorily in many cases. However, several issues have hindered practical utilization this process. For example, most nuclear countries recognize only traditional vitrification for treatment of most of the high level waste streams and some low level waste streams. Acceptance of alternative technologies by the stakeholders and other interested parties has been limited, in spite of benefits from such alternatives. Currently, there are no official waste acceptance criteria and accepted testing procedures for alternative waste-forms, such as CBPCs, that are produced at room temperature. In addition, vitrification results in a significant waste volume reduction as the volatile compounds, including water, present in the waste are driven away. In any room temperature stabilization technology the volatile compounds remain in the waste-form, and as a result, there is no volume reduction. In fact, depending on the waste stream or other factors, there can be an increase in the volume. Storage of high volume waste-forms is expensive, and over a period of many years the cost of vitrification and storage may turn out to be cheaper than room temperature stabilization despite initial high cost of vitrification.

The issue of volatile fission products is not limited to legacy defense waste or other liquid wastes only. Nuclear power plants generate spent nuclear fuel, which also faces the same problem during vitrification. In addition, to improve the efficiency of the power plants and also to reduce the volume of the waste stream, several technologies are being pursued to recycle the spent fuel and extract more power out of it. As more power is extracted, more fission reactions occur, thus producing more fission products (including volatile fission products). Table 1 illustrates Cs-137 concentration in spent fuel from a PWR reactor at various burn-up levels based on information in NUREG/CR-6798, "Isotopic Analysis of High-Burnup PWR Spent Fuel Samples From the Takahama-3 Reactor", prepared by C. E. Sanders, I. C. Gauld, ORNL (2003).

TABLE 1

| | Burn-up level (Gwd/MTU): | | | | |
|---|---|---|---|---|---|
| | 7.79 | 14.3 | 24.35 | 35.42 | 47.25 |
| Cs-137 (g/TU): | 280 | 540 | 930 | 1350 | 1760 |

The burn-up level results in reduction of actinide energy in the spent fuel, but because of more fission reactions, the fission product concentration increases and hence the problem of immobilization of Cs-137 in the waste stream gets worse. For example, raising the burn-up level from 7.79 Gwd/MTU to 47.25 Gwd/MTU increases cesium content from 280 g/MgU to 1760 g/MgU. From the data in the NUREG/CR-6798 referenced above, production of volatile fission product appears to be directly proportional to the burnup level. It is expected that future plants will have even higher burnup levels. Thus, by raising burn-up level, the level of fission products in it will be higher even though total spent fuel will be reduced. Thus, the issue of volatile fission products will gain more importance in the near future.

There is also another safety and security issue with Cs-137. This isotope is used in commercial radioactive sources used for blood sterilization, medical and industrial research, and instrument calibration. Commercial Cs-137 sources are produced by packing radioactive cesium chloride (CsCl) powder in capsules that are then introduced in irradiator equipment. Cs-137 has an extremely high specific activity (87 Ci/g) and is readily dispersible in groundwater. Even a small amount can contaminate a large body of water. The IAEA has identified Cs-137 sources as a global security threat and NRC policy statement calls for development of safe sources by using safer matrices.

The methods and materials described herein address the issues described above by providing a method of immobilizing waste materials, such as radioisotope wastes, in a non-dispersible, and hence safe, vitrified CBPC article that does not require altering the capsule design or hardware utilized in conventional CBPC immobilization. The resulting ceramic has negligible solubility, is difficult to fragment, and is stable even at high temperatures.

SUMMARY OF THE INVENTION

In one aspect, the present invention provides a method of immobilizing a radioisotope. The method comprises the steps of (a) combining a radioisotope-containing material, MgO (e.g., calcined MgO), a source of phosphate (e.g., $KH_2PO_4$), and optionally, a reducing agent, in water at a temperature of less than 100° C. to form a slurry; (b) curing the slurry, preferably without agitation and without application of external heat, to form an intermediate chemically bonded phosphate ceramic (CBPC) article therefrom; (c) comminuting the ceramic into fine particles (e.g., by crushing, grinding, milling, impact, attrition, and the like); (d) mixing the fine particles of ceramic with borosilicate glass fits; and (e) heating the mixture from the previous step (d) at a temperature in the range of about 900 to about 1500° C. (e.g., about 1100 to about 1300° C.) to form a vitrified CBPC article comprising the radioisotope immobilized therein.

In some embodiments, the fine particles of ceramic have a particle size in the range of about −30 to about +350 mesh, e.g., about −75 to about +200 mesh as determined by standard sieve analysis (a "−" before the mesh number refers to the sieve mesh size through which all particles should pass, and a "+" before the mesh number refers to the sieve mesh size through which no particles will pass, i.e., for the range −30 to +350, the fine particles will have a size of no greater than 30 mesh and no smaller than 350 mesh). The particles size of the borosilicate glass fits is not generally limited, since the glass melts below the vitrifying temperature of the ceramic. Typically, the slurry is prepared at a total solids concentration in the range of about 75 to about 85 percent by weight (wt %), e.g., about 78 to about 82 wt %.

In some embodiments, the radioisotope-containing material comprises at least one radioisotope selected from the group consisting of a radioisotope of Cs, Sr, and I. In embodiments in which the radioisotope-containing material comprises a radioisotope of Tc, the slurry preferably comprises a reducing agent (e.g., an Sn(II) compound such as $SnCl_2$) for reducing Tc(VII) to Tc(IV). Optionally, the radioisotope-containing material can contain multiple radioisotopes. In one preferred embodiment, the slurry is prepared with a molar ratio of $MgO$-to-$KH_2PO_4$-to-water of about 1:1:5.

The radioisotope-containing material can comprise a solid material, a liquid, or a combination thereof (e.g., a suspension, a slurry, or a radioactive waste sludge), which contains at least one radioactive isotope. In the methods and articles described herein, the radioisotope initially is incorporated as a component of a magnesium phosphate-based CBPC intermediate, which is then comminuted, mixed with fine borosilicate glass fits, and then vitrified by heating to form a glass-ceramic article that is stable and highly resistant to leaching of the radioisotope or radioisotopes immobilized therein.

Optionally, the slurry can include additional materials such as oxide or salts of other metals (e.g., one or more additional oxides or salts of an element selected from the group consisting of an alkaline earth metal, a transition metal, a main group metal, a lanthanide, an actinide, and a metalloid), an extender (e.g., fly ash, wollastonite, silica sand), and the like. Generally, it is preferred that the extender have a particle size of −100 to +250 mesh (e.g., −150 to +250 mesh) as determined by standard sieve analysis. When the radioisotope-containing material is a radioactive waste product, the slurry and resulting ceramic will also contain various radioactive and non-radioactive materials that are commonly present in such waste products.

In another aspect, the present invention provides a vitrified chemically bonded phosphate ceramic (CBPC) article produced by any of the method embodiments of the invention described herein.

In yet another aspect, the present invention provides a Cs-137 radioactive source comprising a vitrified chemically bonded phosphate ceramic article. The article comprises a ceramic component of the empirical formula: $MgK_{(1-x)}Cs_xPO_4$, wherein $0<x\leq1$, in which the Cs comprises Cs-137. In some embodiments, the article comprises less than about 2 wt % (e.g., less than about 1 wt %) of free Cs that is not chemically bound in the ceramic component.

In another aspect, the present invention provides 20. A crystalline magnesium phosphate composition having the formula: $Mg_{(1-y)}M^1_yK_{(1-x)}M^2_xPO_4$, wherein $0\leq x\leq1$, $0\leq y\leq1$, in which the $M^1$ a divalent metal ion (e.g., Sr, Hg), and $M^2$ comprises a monovalent metal ion (e.g., Cs) at least one of x and y is not equal to 0, and wherein the magnesium phosphate composition optionally includes water of crystallization within the crystalline structure thereof. Preferably, the crystalline magnesium phosphate composition comprises at least one radioisotope, a volatile toxic element, or a combination thereof immobilized therein.

The methods and materials of the present invention provide a relatively safe way of immobilizing waste materials that normally are volatile at temperatures used for traditional glass vitrification (e.g., about 900 to about 1500° C.) toxic/radioactive waste disposal processes. The vitrified CBPC articles produced by the methods described herein immobilize the normally volatile waste materials in a manner such that surprisingly little of the volatile materials are vaporized during the vitrification step. In addition, the toxic and radioactive components also are surprisingly resistant to aqueous leaching from the vitrified CBPC articles.

BRIEF DESCRIPTION OF THE DRAWINGS

The invention consists of certain novel features and a combination of parts hereinafter fully described, illustrated in the accompanying drawings, it being understood that various changes in the details may be made without departing from the spirit, or sacrificing any of the advantages of the present invention.

DETAILED DESCRIPTION OF SELECTED EMBODIMENTS

Figure 1:
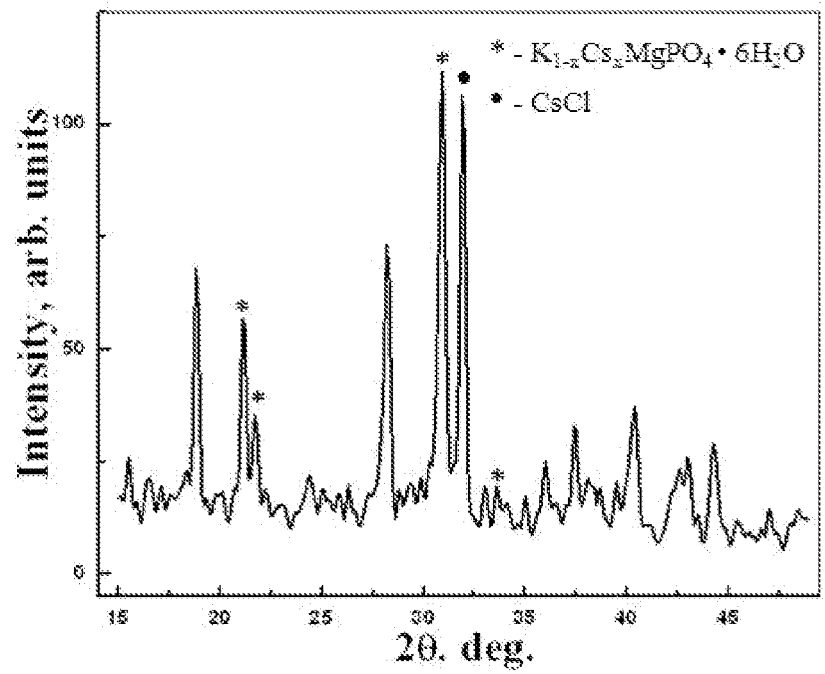
FIG. 1 depicts X-ray diffraction patterns of CBPC containing (A) 10 wt % CsCl, and (B) 15 wt % CsCl.
Figure 1:
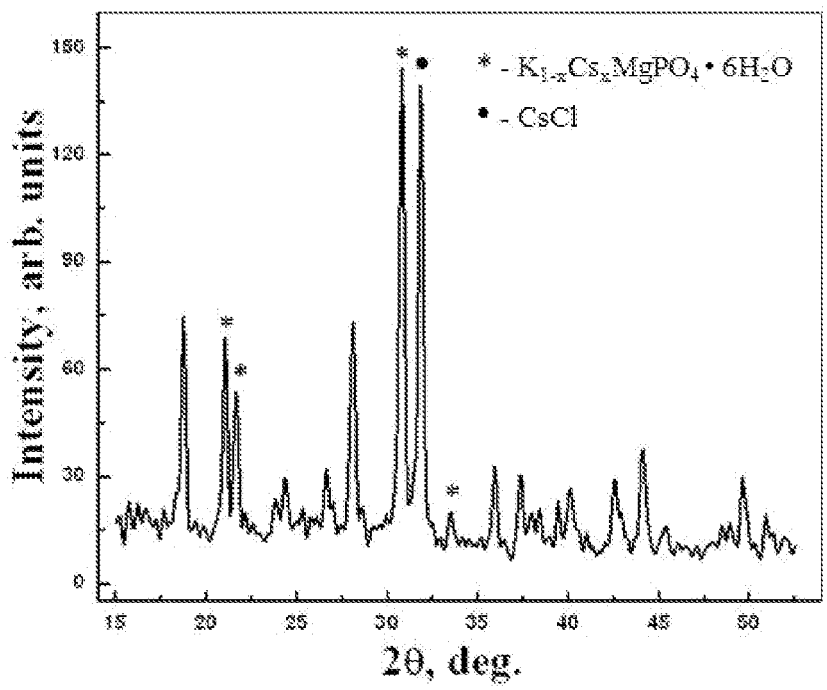

CBPC synthesis consists of mixing calcined magnesium oxide (MgO) with mono potassium phosphate ($KH_2PO_4$) in water at stoichiometric proportion and producing the ceramic as per Equation 1 (Eq. 1).

$$MgO+KH_2PO_4+5H_2O \rightarrow MgKPO_4 \cdot 6H_2O \qquad (1)$$

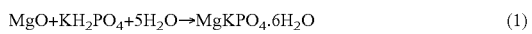

The right side of Eq. 1 represents the ceramic. The properties of this ceramic can vary depending on the extenders that may be added, such as fly ash or wollastonite ($CaSiO_3$). Such extenders make the product substantially pore free and enhance the flexural strength of the matrix by two to three fold.

When oxides or salts of Cs are added to the initial slurry, potassium (K) in the product is partially replaced by Cs, and the mineral product $MgK_{1-x}Cs_xPO_4 \cdot nH_2O$ is formed, in which x is a fraction that can vary from 0 to 1 depending on how much of K has been replaced by Cs, and n is number of molecules of water in the crystalline structure of that compound (typically up to 6). This mineralization immobilizes the Cs in the crystalline matrix, reduces Cs leachability in groundwater, and also reduces or eliminates Cs vaporization in off-gases. The resulting ceramic is extremely stable and Cs is immobilized both in aqueous solutions and at high temperature.

Strontium can be stabilized in CBPC, as well. Strontium oxide is sparsely soluble and can be converted to phosphate easily. For example, Sr can replace Mg in the basic CBPC reaction to form strontium potassium phosphate ($SrKPO_4.nH_2O$), as shown in Eq. 2.

$$SrO + KH_2PO_4 + (n-1)H_2O \rightarrow SrKPO_4 \cdot nH_2O \qquad (2)$$

$SrKPO_4.nH_2O$ is stable at high temperatures, except for loss of the water of crystallization that occurs during heating. Thus, inclusion of Sr in the mixture of MgO and phosphate results in a mixed composition mineral with both Mg and Sr in the mineral formula. Vitrification proceeds in the same manner as described above.

Stabilization of technetium in CBPC requires a slight modification relative to Cs and Sr, since technetium typically is present in the volatile pertechnatate form in Tc-containing waste materials. To reduce the volatility, the waste can be mixed with reducing agent, e.g., stannous chloride or an alkali metal sulfide such as sodium sulfide, potassium sulfide, and the like, to convert the pertechnatate to the less volatile technetium oxide form ($TcO_2.2H_2O$). The reducing agent can be present at a concentration in the range of about 0.1 to about 1 wt % in the slurry. Alternatively, the waste can be pretreated with the reducing agent prior to being combined with the MgO, source of phosphate, and water to form the slurry. The use of a reducing agent avoids volatilization of pertechnatate at 140° C. Unfortunately, $TcO_2$ volatilizes between 800 to 1000° C. if it is not chemically immobilized or at lease microencapsulated in the phosphate matrix. The methods described herein address these problems by conversion of pertechnatate into technetium oxide by incorporating small amount of tin chloride as described before, and then microencapsulating the technetium (IV) oxide in a CBPC matrix containing MgO and phosphate. Alternatively, oxalate can be added to the matrix slurry (e.g., in an amount in the range of about 0.1 to about 1 wt %) to significantly enhance the solubility of $TcO_2$ and facilitate conversion to a phosphate (e.g., $TcOKPO_4$ or any other phosphate form), thereby chemically immobilizing the technetium.

Iodine also can be immobilized in the CBPC, e.g., in an apatite mineral form of the formula $M_{10}(PO_4)_6I_2$ or $M_5(PO_4)_2I_2$, where M can be a divalent metal such as Mg. Thus, the MgO and source of phosphate utilized in the methods of the present invention can convert iodide to the nonvolatile iodophosphate, in situ.

In addition to the minerals described above, it is also possible that Cs, Sr, I, and Tc fission products can reside in more complex phosphate, or silicate, or phosphosilicate minerals within the vitrified ceramic structure.

The methods of the present invention involve the steps of combining a radioisotope-containing material (e.g., at a concentration of about 1 to about 50 wt %, preferably about 10 to about 35 wt %), MgO (e.g., calcined MgO), a source of phosphate (e.g., about 20 to about 30 wt % $KH_2PO_4$), and optionally, a reducing agent, in water at a temperature of less than 100° C. to form a slurry. The slurry is then cured, preferably without agitation and without application of external heat, to form an intermediate chemically bonded phosphate ceramic (CBPC) article comprising the radioisotope. The intermediate CBPC article is then comminuted, mixed with fine borosilicate glass fits, and heated at a temperature in the range of about 900 to about 1500° C. (e.g., about 1100 to about 1300° C.) to form a vitrified CBPC article comprising the radioisotope immobilized therein. Preferably, the MgO, phosphate, and water are combined approximately in the stoichiometry of Eq. 1, described above, i.e., in a molar ratio of MgO-to-$KH_2PO_4$-to-water of about 1:1:5. Optionally, the stabilized CBPC ceramic may also be directly fed into a traditional glass vitrifier along with the bulk waste. Combining the CBPC vitrification process described herein with traditional glass vitrification may enhance the immobilization process without significantly increasing the total volume destined for disposal, because the amount of CBPC included with immobilized fission products can be kept to a relatively small level.

Optionally, the CBPC articles described herein can include extender/filler materials such as fly ash, wollastonite (calcium metasilicate), silica sand, magnesium metasilicate, aluminum oxide, or and/or aluminum hydroxide, and the like. The extender or filler can be present in an amount in the range of about 0 to about 30 wt %, and preferably, is utilized, at a level of about 10 to about 20 wt %.

Another aspect of the present invention provides a safer Cs-137 radioactive source than is currently available. The Cs-137 source comprise a vitrified CBPC formed by incorporating commercial radioactive CsCl into the CBPC matrix, followed by vitrification. Table 2 provides calculated parameters for CBPC-based CsCl sources at two different CsCl loadings, which demonstrate the vitrified Cs-CBPC can retain the same volume as that of commercial radiation sources, while maintaining similar activity and performance.

TABLE 2

Parameters related to commercial CsCl sources and theoretical parameters for corresponding CBPC-based Cs sources.

| Parameter | Commercial source CDC.ZD1 | | Commercial source CDC.ZD2 | |
|---|---|---|---|---|
| Volume (mm³) | 169.6 | | 130.6 | |
| Activity (Curies) | 0-3.75 | | 3.75-5.75 | |
| | CBPC-Cs source based on CDC.ZD1 | | CBPC-Cs source based on CDC.ZD2 | |
| CsCl loading | 15 wt % | 20 wt % | 15 wt % | 20 wt % |
| Activity (Curies) | 3.711 | 4.95 | 2.84 | 3.79 |

A preferred vitrified CBPC radioactive Cs source comprises a ceramic component of the empirical formula: $MgK_{(1-x)}Cs_xPO_4$, wherein $0 < x \le 1$, in which the Cs comprises Cs-137, and optionally can include water of crystallization within the ceramic mineral structure. Preferably, the article comprises less than about 1 wt % (more preferably less than about 0.1 wt %) of free Cs that is not chemically bound in the ceramic component. Optionally, the radioactive Cs-CBPC source can include additional materials such as fly ash, wollastonite, of silica sand, e.g., at a concentration in the range of about 10 to about 30 wt %.

In another aspect, the present invention provides a crystalline magnesium phosphate composition having the formula: $Mg_{(1-y)}M^1_yK_{(1-x)}M^2_xPO_4$, wherein $0 \le x \le 1$, $0 \le y \le 1$ in which the $M^1$ a divalent metal ion (e.g., Sr, Hg), and $M^2$ comprises a monovalent metal ion (e.g., Cs) at least one of x and y is not equal to 0, and wherein the magnesium phosphate composition optionally includes water of crystallization within the crystalline structure thereof. Preferably, the crystalline magnesium phosphate composition comprises at least one radioisotope (i.e., a radioisotope of Cs, Sr, Tc, I, etc.,) a volatile toxic element (e.g., Hg, As), and the like, immobilized therein.

The following non-limiting examples are provided to illustrate certain features of the methods and materials described herein.

EXAMPLE 1

Vitrified CBPC Immobilized Waste Form

Simulated Hanford tank sludge (KE basin sludge) was incorporated in CBPC and vitrified. This sludge contains trace levels of hazardous metals such as Cr, Cd, Pb, traces of actinide simulants, and non-radioactive Cs and Sr in place of the fission products Cs-137 and Sr-90, as well as oxides of major elements such as Al, Ca, Mg, Ba and the like. This simulated waste was crushed to a fine powder and was incorporated in a CBPC matrix by mixing with MgO, $KH_2PO_4$ and water in the proportions of Eq. 1, described herein. Additional samples were prepared in which the powdered simulated waste was mixed with granulated bottle glass frits in a weight ratio of about 1:9. The glass had the composition: $SiO_2$=65-73 wt %, $Al_2O_3$=0.5-10.0 wt %, $Fe_2O_3$=0.2-3.0 wt %, CaO=5-12 wt %, MgO=0-3 wt %, $P_2O_5$=0-2 wt %, and $Na_2O$=10-17 wt %. The resulting mixtures (with and without glass) were vitrified by heating at about 1200° C. for about one hour. The samples with and without glass retained their general form, shrinking slightly because of loss of bound water, and formed hard glass ceramic articles upon vitrification. The observed shrinkage was not related to the waste loading, because samples with different loadings shrunk to about the same extent.

EXAMPLE 2

Production of a Vitrified CBPC Radioactive Source with CsCl

Nonradioactive CsCl was utilized to safely simulate a radioactive CsCl source. Vitrified CBPC-Cs articles were produced with volumes of a few cubic centimeters by the methods described herein. CsCl loadings were about 10 and 15 wt % respectively. Powders of CsCl, MgO, and $KH_2PO_4$ were mixed together, and water was added to the mixture with agitation according to the stoichiometric proportion given in Eq. 1. The time interval between the beginning of agitation and solidification was about 5 to 6 minutes. The temperature rose up to 48° C. during this period. Several samples were made this way.

After the samples had set for about one week, small pieces of the vitrified CBPC were crushed into fine powders and subjected to X-ray diffraction. The diffraction patterns of the two samples are presented in FIG. 1. Panel A of FIG. 1 provides the results for a sample comprising 10 wt % CsCl loading, while Panel B provides the results from a sample having a 15 wt % CsCl loading. As is evident in FIG. 1, some of the CsCl was incorporated into a $K_{1-x}Cs_xMgPO_4 \cdot 6H_2O$ mineral form, by substitution of x moles of Cs for K. There also was some unreacted CsCl left in the matrix. The unmarked peaks are from $MgKPO_4 \cdot 6H_2O$ and represent original CBPC or unreacted MgO. Cs incorporation into the mineral structure resulted in a small displacement of the basic $KMgPO_4 \cdot 6H_2O$ x-ray lines towards smaller angles. This is characteristic of x-ray diffraction peaks, when substitution of atoms of lower ionic radii such as that of potassium, are replaced by atoms of higher ionic radii, in this case cesium.

EXAMPLE 3

Effect of High Temperature on Stability of CsCl-Containing CBPC

Figure 2:
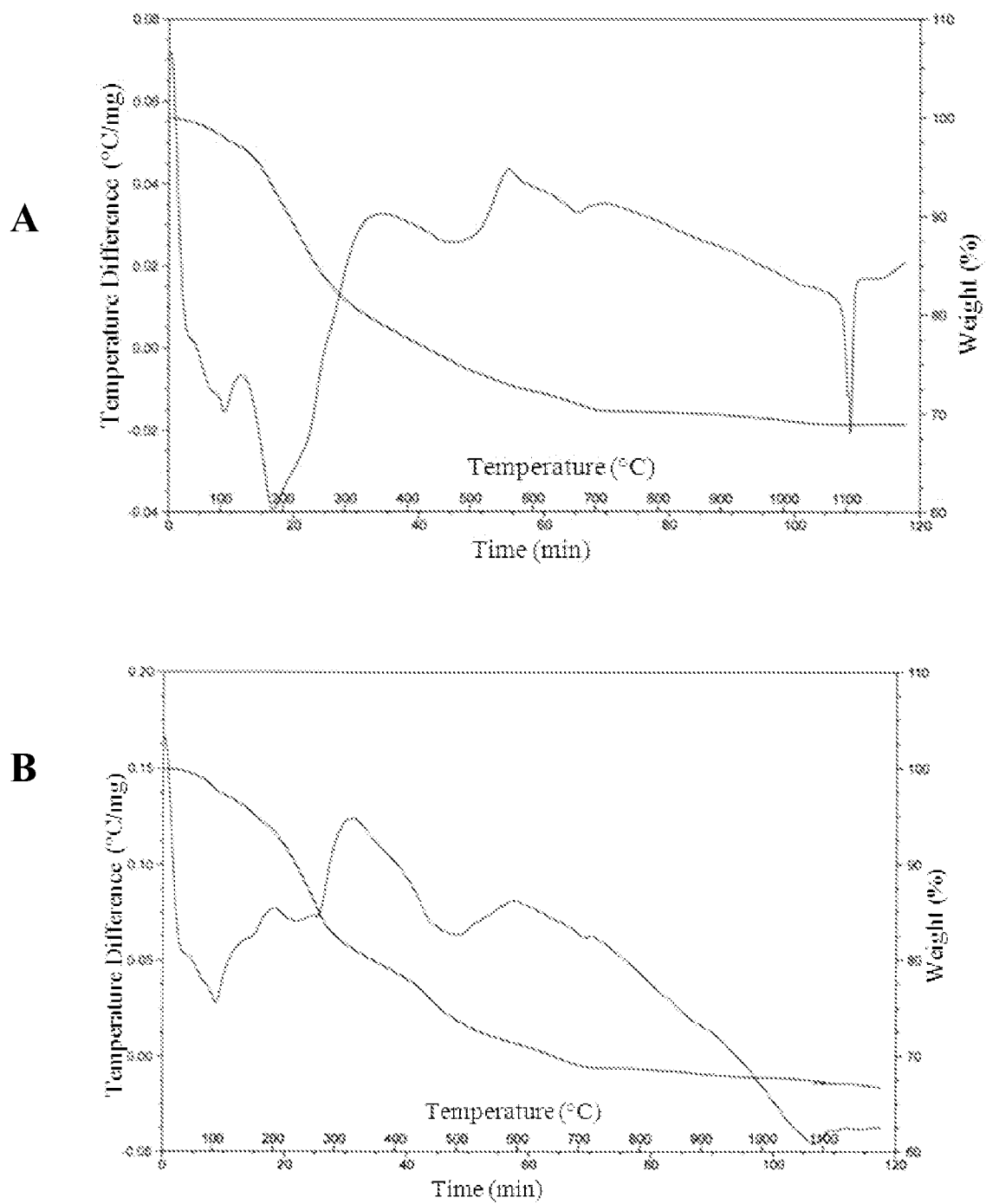
FIG. 2 shows DTA/TGA data for CBPC containing (A) 10 wt % CsCl and (B) 15 wt % CsCl.

The volatility of Cs during vitrification of a CBPC matrix was evaluated using thermogravimetry. DTA/TGA data samples containing 10 wt % and 15 wt % CsCl (FIG. 2, Panels A and B, respectively) indicated that there was no weight loss by the CsCl-containing CBPC samples after heating to 1200° C. other than loss of water of crystallization in the temperature range between 0 and 700° C. Above 700° C., the sample weight remained substantially the same. Endothermic peaks were observed at temperatures of 1106° C. (FIG. 2, Panel A) and 1080° C. (FIG. 2, Panel B), which were due to the sample material melting without any mass loss.

The structure of the CsCl-containing CBPC materials were investigated using a high resolution microscope after vitrification. The CBPC samples with added cesium were subjected to heat treatment in air at about 1150° C., with a hold time of about 1 hour. The samples (about 2 to 3 grams each) were placed in small alumina troughs and heated to desired temperatures, cooled and then weighed. Samples heated to 700° C. lost about 27 to 28% of their weight, which corresponds to the water of crystallization (bound water). When heated beyond 700° C. to about 1150° C., the weight loss of the samples was only about 1%. Near this temperature, the sample material started melting. Microscopic analysis was consistent with water evaporation during heating, and glass formation when heated to 1150° C.

EXAMPLE 4

Elemental Analysis of CBPC-CsCl

The X-ray diffraction patterns shown in FIG. 1 included peaks attributable to free CsCl. Since free CsCl may potentially evaporate or leach into groundwater, elemental analysis of samples heated at different temperatures was carried out to determine the CsCl content as a function of temperature. The elemental analyses were performed using a high-resolution double-focusing laser mass-spectrometer EhMAL-2. The observed standard deviation of the elemental content was about 0.1 to 0.3 wt %. The data are presented in Table 3.

TABLE 3

Elemental analysis of CBPC-CsCl

| | Content (wt %) | | | |
|---|---|---|---|---|
| | 10 wt % CsCl | | | 15 wt % CsCl |
| Element | 700° C. | 1076° C. | 1150° C. | 1050° C. |
| O | 30.78 | 32.28 | 30.43 | 30.68 |
| Na | 3.46 | 2.43 | 3.33 | 2.88 |
| Mg | 24.09 | 25.52 | 22.47 | 23.47 |
| Al | 0.02 | 0.36 | 0.83 | 0.81 |
| Si | 0.17 | 0.12 | 0.18 | 0.85 |
| P | 14.57 | 21.09 | 14.67 | 18.77 |
| S | 0.81 | 0.25 | 0.15 | 0.63 |
| Cl | 5.87 | 0.026 | 0.027 | 0.014 |
| K | 9.87 | 7.05 | 17.44 | 4.99 |
| Ca | 0.066 | 0.12 | 0.095 | 0.073 |
| Cs | 10.27 | 10.75 | 10.3 | 16.81 |

The results in Table 3 show that Cs content remains substantially constant at very nearly equal to the amount added during production of samples. There is a slight rise in the Cs content in each case upon heating, which likely is due to loss of water during heating.

EXAMPLE 5

Retention of Cs in Aqueous Leaching Tests and Other Physical Properties

The Environmental Protection Agency's Toxicity Characteristic Leaching Procedure (Toxicity Characteristic Leaching Procedure, US EPA, Rev. II (1992), pp. 138-139) was followed to evaluate the leaching resistance of the immobilized Cs in the CBPC matrix. In this test, the samples were crushed to a size capable of passing through a 0.95 micrometer sieve and then subjected to 18 hours of leaching in water at a pH of about 5. The test was conducted on the two samples of the non-vitrified intermediate Cs-CBPC. The test results indicated that the sample with 15 wt % loading of CsCl leached only about 0.045 wt % CsCl and a sample with 20 wt % loading of CsCl leached only about 0.764 wt %. These results were surprising given the highly soluble nature of free CsCl, indicating that the Cs from these samples is virtually non-leachable even without vitrification, and hence even if the samples are crushed and put in water streams, the leaching of Cs would be very small.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The terms "consisting of" and "consists of" are to be construed as closed terms, which limit any compositions or methods to the specified components or steps, respectively, that are listed in a given claim or portion of the specification. In addition, and because of its open nature, the term "comprising" broadly encompasses compositions and methods that "consist essentially of" or "consist of" specified components or steps, in addition to compositions and methods that include other components or steps beyond those listed in the given claim or portion of the specification. Recitation of ranges of values herein are merely intended to serve as a shorthand method of referring individually to each separate value falling within the range, unless otherwise indicated herein, and each separate value is incorporated into the specification as if it were individually recited herein. All numerical values obtained by measurement (e.g., weight, concentration, physical dimensions, removal rates, flow rates, and the like) are not to be construed as absolutely precise numbers, and should be considered to encompass values within the known limits of the measurement techniques commonly used in the art, regardless of whether or not the term "about" is explicitly stated. All methods described herein can be performed in any suitable order unless otherwise indicated herein or otherwise clearly contradicted by context. The use of any and all examples, or exemplary language (e.g., "such as") provided herein, is intended merely to better illuminate certain aspects of the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The embodiments of the invention in which an exclusive property or privilege is claimed are defined as follows:

1. A method of immobilizing a radioisotope comprising the steps of:
    (a) combining a radioisotope-containing material, MgO, a source of phosphate, and optionally, a reducing agent, in water at a temperature of less than 100° C. to form a slurry;
    (b) curing the slurry to form an intermediate chemically bonded phosphate ceramic (CBPC) article comprising the waste material therefrom;
    (c) comminuting the intermediate ceramic into fine particles;
    (d) mixing the fine particles of CBPC with borosilicate glass frits; and
    (e) heating the mixture resulting from step (d) at a temperature in the range of about 900 to about 1500° C. to form a vitrified CBPC article comprising the radioisotope immobilized therein.

2. The method of claim 1 wherein the radioisotope-containing material comprises at least one radioisotope selected from the group consisting of a radioisotope of Cs, Sr, and I.

3. The method of claim 1 wherein the radioisotope-containing material comprises a radioisotope of Tc and the slurry comprises a reducing agent for reducing Tc(VII) to Tc(IV).

4. The method of claim 3 wherein the reducing agent comprises Sn(II).

5. The method of claim 1 wherein the radioisotope-containing material comprises a solid material, a liquid material, or a combination thereof.

6. The method of claim 1 wherein the radioisotope-containing material comprises a radioactive waste sludge.

7. The method of claim 1 wherein the step of heating is performed at a temperature in the range of about 1100 to about 1300° C.

8. The method of claim 1 wherein the source of phosphate comprises $KH_2PO_4$.

9. The method of claim 1 wherein the slurry is prepared with a molar ratio of MgO-to-$KH_2PO_4$-to-water of about 1:1:5.

10. The method of claim 1 wherein the slurry further comprises one or more additional an oxide or salt of an element selected from the group consisting of an alkaline earth metal, a transition metal, a main group metal, a lanthanide, an actinide, and a metalloid.

11. The method of claim 1 wherein the slurry further comprises one or more extenders selected from fly ash, wollastonite, and silica sand.

* * * * *